UNITED STATES PATENT OFFICE 2,466,517

PROCESSES FOR PREVENTING CORROSION AND CORROSION INHIBITORS

Charles M. Blair, Jr., Webster Groves, and William F. Gross, Glencoe, Mo., assignors to Petrolite Corporation, Ltd., Wilmington, Del., a corporation of Delaware No Drawing. Application January 10, 1948, Serial No. 1,657

16 Claims. (Cl. 252—8.55)

This invention relates to the inhibition of corrosion of metals, and particularly to a composition for use in preventing corrosion of metals and particularly iron, steel, and ferrous alloys. The corrosion inhibitors contemplated herein find special utility in the prevention of corrosion of pipe or equipment which is in contact with a corrosive oil-containing medium, as, for example, in oil wells producing corrosive oil or oil-brine mixtures, in refineries, and the like. Our inhibitors may, however, be used in other systems or applications. They appear to possess properties which impart to metals resistance to attack by a variety of corrosive agents, such as brines, weak inorganic acids, organic acids, $CO_2$, $H_2S$, etc.

Compounds which we have found to be effective for the purpose described above belong to the general class of cyclic amidines, and in particular are substituted imidazolines, in which the imidazoline molecule contains at least one aliphatic, or cycloaliphatic hydrocarbon group containing from 8 to 32 carbon atoms. Cyclic imidazolines in which the 2-carbon atom is substituted by a long chain aliphatic hydrocarbon group are particularly easy to prepare and are very effective for the present use. However, it has been found that equally effective compounds, if not somewhat more effective in some instances, result when the aliphatic hydrocarbon group occurs as a substituent of one of the nitrogen atoms, or of a relatively small organic radical attached to one of the nitrogen atoms.

The process of preventing corrosion by use of several classes of these reagents is disclosed in our co-pending application Serial No. 1,656, filed January 10, 1948.

We have found that particularly outstanding corrosion-preventive reagents result when the imidazoline compound contains basic nitrogen groups in addition to those inherently present in the imidazoline ring. In general, compounds of this type which are effective are those in which the basic nitrogen group is contained in the radical Y in the formula below.

In this case the products may be represented by the formula:

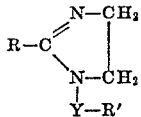

where R and R' are members of the class consisting of hydrocarbon radicals and hydrogen, and in which at least one of the groups R and R' is an aliphatic or cycloaliphatic hydrocarbon group containing from 8 to 32 carbon atoms; and Y is a divalent organic radical containing amino groups. The group R' may be—and usually is—an amino nitrogen substituent. Examples of organic radicals which Y—R' may represent are:

$$-C_2H_4-NR'_2$$
$$-C_2H_4-NR'-C_2H_4-NR'_2$$
$$-C_3H_6-NR'_2$$
$$-CH_2-CH-CH_3$$
$$\quad\quad\quad |$$
$$\quad\quad\quad NR'_2$$
$$-CH_2-CH-CH_2-OH$$
$$\quad\quad\quad |$$
$$\quad\quad\quad NR'_2$$

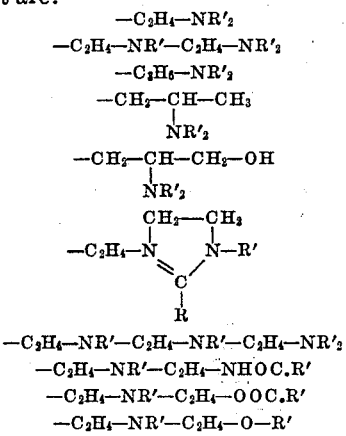

$$-C_2H_4-NR'-C_2H_4-NR'-C_2H_4-NR'_2$$
$$-C_2H_4-NR'-C_2H_4-NHOC.R'$$
$$-C_2H_4-NR'-C_2H_4-OOC.R'$$
$$-C_2H_4-NR'-C_2H_4-O-R'$$

where R' and R have their previous significance.

Of this class of reagents in which an amino group occurs as a portion of the 1-nitrogen substituent, those which are derived, at least theoretically, from the polyethylene polyamines appear to be particularly effective as corrosion inhibitors and are so outstanding as to constitute an invention within an invention. These have the general formula:

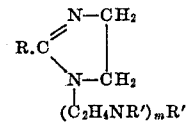

where R and R' have their previous meanings, and $m$ is a small number, usually less than 6.

The preparation of an imidazoline substituted in the 2-position by aliphatic hydrocarbon radicals is well described in the literature and is readily carried out by reaction between a monocarboxylic acid and a diamine, or polyamine, containing at least one primary amino group, and at least one secondary amino group, or another primary amino group, separated from the first primary amino group by two carbon atoms. Examples of suitable polyamines which can be employed for this conventional imidazoline synthesis include diethylenetriamine, triethylenetetramine, tetraethylenepentamine, hydroxyethyldiethylenetriamine, N,N-dibutyldiethylenetriamine, 3-aminoethyl, 1,2-diaminobutane, dipropylenetriamine (from 1,2-propylenediamine) and the like. For details of the preparation of these reagents see the following United States patents: No. 1,999,989, dated April 30, 1935, Max Bockmuhl et al.; No. 2,155,877, dated April 25, 1939, Edmund Waldmann et al.; and No. 2,155,878, dated April 25, 1939, Edmund Waldmann et al. Also see Chem. Rev., 32, 47–(43).

When an aliphatic or cycloaliphatic carboxylic acid containing 9 or more carbon atoms is employed in the above described synthesis, the resulting imidazoline will contain a 2-substituent consisting of an aliphatic hydrocarbon radical containing 8 or more carbon atoms. Suitable corrosion-preventive reagents may, therefore, be made directly by reaction of acids such as oleic acid, linoleic acid, linolenic acid, erucic acid, tall oil fatty acids, naphthenic acids, nonoic acid, and the like, with suitable amines such as those enumerated above. When this condensation is carried out at a temperature of 250° C. or higher, between equal mole proportions of mono-carboxylic acid and polyamine, two moles of water are evolved and the desired imidazoline is formed in almost quantitative yield. Such suitable reagents may be represented by the following formula:

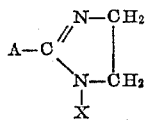

where X may be ethylene amino radicals, hydroxyethylamino radicals, aminoalkyl radicals, ester radicals containing amino groups, ether radicals containing amino groups, amido radicals containing amino groups, or the like; and where A is an aliphatic or cycloaliphatic hydrocarbon radical having from 8 to 32 carbon atoms. In the above formulas for imidazolines it should be pointed out that if X were a hydrogen atom, the nitrogen atoms would become equivalent insofar as reaction is concerned and could not be distinguished from one another. This is supposed, on theoretical grounds, to result from the mobility of the hydrogen proton, and its ease of transfer from one nitrogen atom to the other. However, where X is an organic substituent other than hydrogen, the nitrogen atoms are no longer equivalent. For the purpose of the present application the nitrogen atom to which the radical X is attached will be called the 1-nitrogen atom of the imidazoline ring. This is in conformance with the usual chemical convention in numbering heterocyclic ring positions.

As mentioned above, we have discovered that equally suitable corrosion-preventive reagents may be obtained by introduction into the imidazoline compound of an aliphatic hydrocarbon group of proper size as a portion of the substituent attached to the 1-nitrogen atom of the imidazoline ring. Where the aliphatic hydrocarbon group occurs in this position it is unnecessary that the 2-carbon atom substituent contains 8 or more carbon atoms. It may be, in fact, only a hydrogen atom or a methyl group, ethyl group, phenyl group, or other relatively small hydrocarbon group, although it is not restricted to such small groups. The preparation of imidazoline compounds in which the higher molecular weight hydrocarbon radical occurs as a portion of the nitrogen atom substituent, are also readily prepared by methods analogous to those already described. In this case, however, a number of alternative procedures are possible. For example, one may prepare 2-methyl, 1-(octadecyl aminoethyl-) imidazoline by reaction of octadecyl aminoethylethylenediamine with acetic acid at a temperature of 250° to 300° C. until two moles of water are evolved for every mole of acetic acid employed. The same reagent may result by the preparation of 2-methyl, 1-aminoethyl imidazoline followed by alkylation with octadecyl bromide and separation of resulting alkylation products to isolate the desired product. For the preparation of 1,2-substituted imidazolines, see King and McMillan, J. A. C. S., 68, 1774 (1946); Kyrides et al., J. Org. Chem., 12, 577 (1947).

Although, as we have specified above, effective corrosion inhibitors are obtained when at least one R group contains from 8 to 32 carbon atoms, we have found that particularly effective reagents and ones having the best solubility characteristics are obtained when R contains at least 10 and not over 20 carbon atoms. Examples of such preferred R groups are decyl, dodecyl, oleyl, stearyl and abietyl.

Examples of suitable corrosion inhibitors in which the aliphatic or cycloaliphatic radical containing from 8 to 32 carbon atoms is a portion of the 1-position substituent of the imidazoline ring, are as follows:

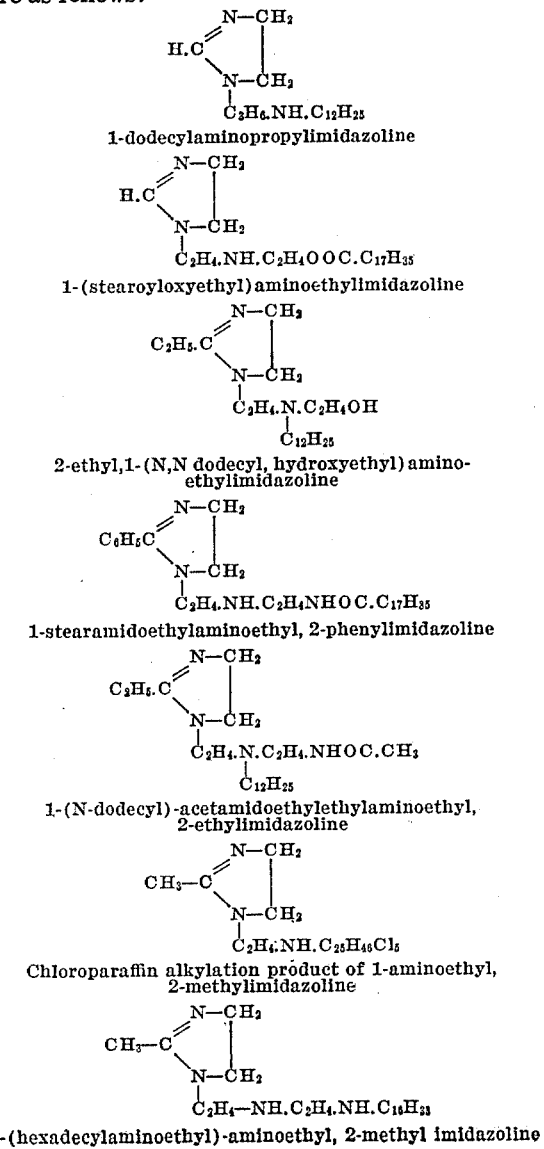

Examples of inhibitors in which the higher molecular weight hydrocarbon radical is a 2-position substituent or occurs in both the 1- and 2-position, are as follows:

8. 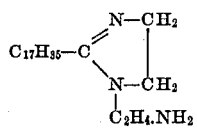

1-aminoethyl, 2-heptadecylimidazoline

9. 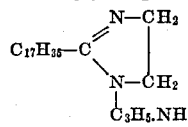

1-(hexyloxyethyl-)aminopropyl, 2-heptadecenylimidazoline

10. 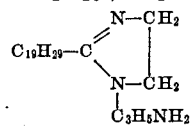

1-aminopropyl, 2-abietylimidazoline

11. 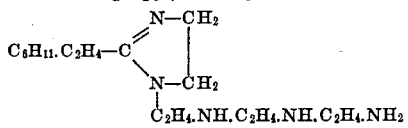

1-triethylenetriamino, 2-cyclohexylethylimidazoline

12. 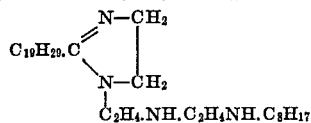

1-(N-octyl)diethylenediamino, 2-abietylimidazoline

The corrosion preventive products of the present invention, since they contain an imidazoline ring, may, in general, be alkylated to form either a 1-alkyl-substituted imidazoline or a quaternary ammonium salt where the alkyl group is attached to either or both the 1 and 3 nitrogen atoms. For example, using cetyl bromide as a typical alkylating agent, the following reactions may be carried out:

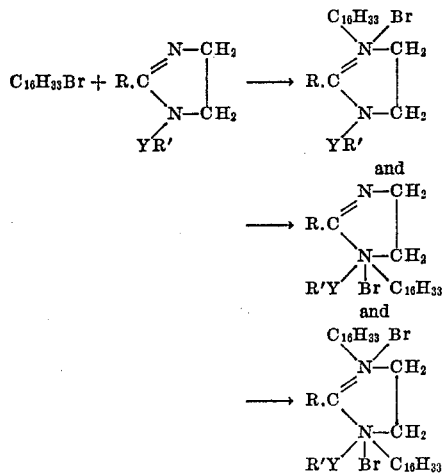

Instead of the cetyl bromide used in the examples above, one may use other alkylating agents, such as methyl bromide, benzyl chloride, ethyl sulfate, dichloroethyl ether, chloroparaffin, etc., to obtain equally suitable derivatives of imidazolines which may be employed in the present process.

Concomitant with the above described alkylation, there will be, of course, alkylation of any amino groups in the 1-position substituent, Y, to a greater or lesser degree.

For details of preparation of various imidazolinium salts such as those mentioned above, see, for example, Shepard and Shonle, J. A. C. S., 69, 2269 (1947).

Although we have described the corrosion inhibitors of our process as imidazolines, we may, in many instances, employ these compounds in the form of their salts, either with organic or inorganic acids. Being relatively strong bases, the imidazolines readily form such salts, and where the reagent contains basic groups in addition to the imidazoline ring nitrogen atoms, they may form di- or polysalts. Examples of acids which may be used to form such salts are hydrochloric acid, sulfuric acid, acetic acid, oxalic acid, maleic acid, oleic acid, abietic acid, phosphoric acid, petroleum sulfonic acid, naphthenic acid, rosin, phenylacetic acid, benzoic acid, and the like.

Salts of the imidazolines, such as those above described, appear to be equally as effective as the free bases. Probably, in the dilute solutions in which they are employed as corrosion inhibitors the salts hydrolyze or otherwise decompose to some extent and reach an equilibrium with the acids and other constituents of the corrosion medium.

While we have described our corrosion inhibitors as imidazolines and have illustrated them above as single ring compounds, it should be pointed out that in some instances reagent compounds containing two or more heterocyclic rings, such as two imidazoline rings, may be employed. For example, if one reacts one mole of tetraethylene pentamine with a mole of stearic acid to form a substituted heptadecylimidazoline, and then reacts this further with another mole of a carboxylic acid at a suitable high temperature, a diimidazoline is obtained.

For example,

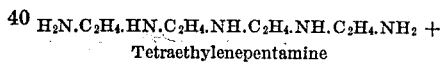
Tetraethylenepentamine

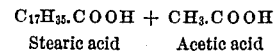
Stearic acid    Acetic acid

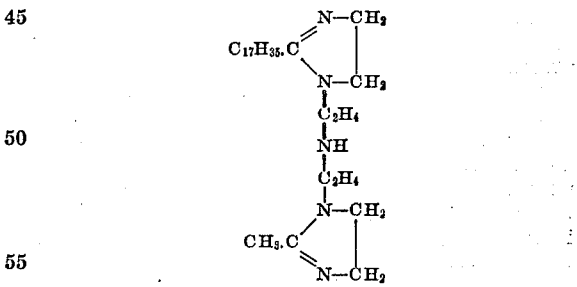

Such diimidazolines are intended to be included when reference is made to substituted imidazolines herein or in the claims.

Many obvious simple derivatives of the herein described corrosion inhibitors may be prepared which are also effective. For example, we have defined the groups R and R' in the structural formulae above as being members of the class consisting of hydrogen, aliphatic and cycloaliphatic hydrocarbon groups. Actually, the use of halogenated hydrocarbon groups appears to yield equally effective reagents, and chlorohydrocarbon groups, particularly, are readily introduced during synthesis. Since the chlorine atoms in these groups are relatively non-reactive and yield products with solubilities similar to the hydrocarbon derivative, they do not differ greatly in behavior from the corresponding hydrocarbon derivative.

Imidazolines containing a relatively high molecular weight hydrocarbon radical, and substituted in the 4- and/or 5-ring positions, are also effective inhibitors, but are not so easily prepared from presently available commercial reagents.

The method of carrying out our process is relatively simple in principle. The corrosion preventive reagent is dissolved in the liquid corrosive medium in small amounts and is thus kept in contact with the metal surface to be protected. Alternatively, the corrosion inhibitor may be applied first to the metal surface, either as is, or as a solution in some carrier liquid or paste. Continuous application, as in the corrosive solution, is the preferred method, however.

The present process finds particular utility in the protection of metal equipment of oil and gas wells, especially those containing or producing an acidic constituent such as $H_2S$, $CO_2$, organic acids and the like. For the protection of such wells, the reagent, either undiluted or dissolved in a suitable solvent, is fed down the annulus of the well between the casing and producing tubing where it becomes commingled with the fluid in the well and is pumped or flowed from the well with these fluids, thus contacting the inner well of the casing, the outer and inner well of tubing, and the inner surface of all well head fittings, connections and flow lines handling the corrosive fluid.

Where the inhibitor composition is a liquid it is conventionally fed into the well annulus by means of a motor driven chemical injector pump, or it may be dumped periodically (e. g., once every day or two) into the annulus by means of a so-called "boll weevil" device or similar arrangement. Where the inhibitor is a solid, it may be dropped into the well as a solid lump or stick, it may be blown in as a powder with gas, or it may be washed in with a small stream of the well fluids or other liquid. Where there is gas pressure on the casing, it is necessary, of course, to employ any of these treating methods through a pressure equalizing chamber equipped to allow introduction of reagent into the chamber, equalization of pressure between chamber and casing, and travel of reagent from chamber to well casing.

Occasionally oil and gas well are completed in such manner that there is no opening between the annulus and the bottom of the tubing or pump. This results, for example, when the tubing is surrounded at some point by a packing held by the casing or earth formation below the casing. In such wells the reagent may be introduced into the tubing through a pressure equalizing vessel, after stopping the flow of fluids. After being so treated, the well should be left closed in for a period of time sufficient to permit the reagent to drop to the bottom of the well.

For injection into the well annulus, the corrosion inhibitor is usually employed as a solution in a suitable solvent such as mineral oil, methylethyl ketone, xylene, kerosene, or even water. The selection of solvent will depend much upon the exact reagent being used and its solubility characteristics. It is also generally desirable to employ a solvent which will yield a solution of low freezing point, so as to obviate the necessity of heating the solution and injection equipment during winter use.

For treating wells with packed-off tubing, the use of solid "sticks" or plugs of inhibitor is especially convenient. These may be prepared by blending the inhibitor with a mineral wax, asphalt or resin in a proportion sufficient to give a moderately hard and high melting solid which can be handled and fed into the well conveniently.

The amount of corrosion preventive agent required in our process varies with the corrosiveness of the system, but where a continuous or semi-continuous treating procedure is carried out as described above, the addition of reagent in the proportion of from one part per 1,000 to one part per 20,000, or more, parts of corrosive fluid will generally provide protection. As an example of treating procedure and results, the following actual well treatment history is presented.

Treatment was made of a South Texas gas-distillate well producing five million cubic feet of gas, 180 barrels of distillate, and 8 barrels of water per day. Weighed steel test plates were inserted into the well head for a period of two weeks prior to treatment of the well. These plates were then removed and weighed to determine the corrosion rate characteristic of the well. At the same time, water samples from the production were analyzed for iron content. Before treatment of the well, it was found that the corrosion rate was 0.035 inch per year and that the iron content of the produced water was 43 P. P. M. A new set of test plates was installed in the well and a solution of 1-triethylenetriamino, 2-heptadecylimidazoline in aromatic naphtha was pumped continuously down the casing of the well in such an amount that two pounds of the substituted imidazoline were injected daily. Under these circumstances, it was found that the corrosion rate of the well was 0.003 inch per year and the iron content of the produced water was 4 P. P. M. The rate of injection of substituted imidazoline was then reduced to one pound per day and it was found that the corrosion rate became 0.005 inch per year while the iron content of the produced water remained at 4 P. P. M. The use of one-half pound per day of imidazoline in this well resulted in a corrosion rate of 0.015 inch per year and an iron content of the produced water of 10 P. P. M.

A similar treatment of a Louisiana distillate well was also made. This well produced four million cubic feet of gas, 75 barrels of distillate, and 10 barrels of water per day. The tubing of this well was closed by means of a packer, with the result that a corrosion inhibitor could not be fed down the well annulus. The corrosion rate of this well was determined by a process identical with that above and was found to be 0.040 inch per year. This well was protected by the use of solid sticks containing substituted imidazoline. These sticks were prepared as follows:

2 parts of 1-diethylenediamino, 2-abietyl-imidazoline was melted with 1 part of abietic acid and 1 part of 190° F. melting point microcrystalline wax. The molten mixture was stirred until homogeneous and poured into molds and allowed to harden into sticks one inch in diameter and eighteen inches long. Each stick weighed 1.2 pounds and contained 0.6 pound of substituted imidazoline. Two such sticks were dropped daily down the tubing of the above described well by means of a "boll weevil" device attached to the tubing at the well head. This treatment resulted in a reduction of the corrosion rate of the well to 0.002 inch per year.

Having thus described our invention, what we claim as new and desire to secure by Letters Patent is:

1. A process for preventing corrosion of metals, comprising the step of applying to such metals a substituted imidazoline of the following formula type:

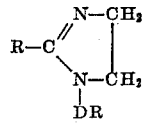

in which D represents a divalent organic radical containing less than 25 carbon atoms, composed of elements from the group consisting of C, H, O, and N, and containing at least one amino group, and R is a member of the class consisting of hydrogen atoms, and aliphatic and cycloaliphatic hydrocarbon radicals; with the proviso that at least one occurrence of R contains from 8 to 32 carbon atoms.

2. A process for preventing corrosion of ferrous metals, comprising the step of applying to such metals a substituted imidazoline of the following formula type:

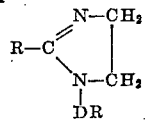

in which D represents a divalent organic radical containing less than 25 carbon atoms, composed of elements from the group consisting of C, H, O, and N, and containing at least one amino group, and R is a member of the class consisting of hydrogen atoms, and aliphatic and cycloaliphatic hydrocarbon radicals; with the proviso that at least one occurrence of R contains from 8 to 32 carbon atoms.

3. A process for preventing corrosion of ferrous metals, comprising the step of applying to such metals a substituted imidazoline of the following formula type:

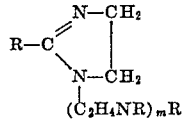

wherein $m$ is the numeral 1 to 6, and R is a member of the class consisting or hydrogen atoms, and aliphatic and cycloaliphatic hydrocarbon radical; with the proviso that at least one occurrence of R contains 8 to 32 carbon atoms.

4. A process for preventing corrosion of ferrous metals, comprising the step of applying to such metals a substituted imidazoline of the following formula type:

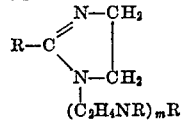

wherein $m$ is the numeral 1 to 6, and R is a member of the class consisting of hydrogen atoms, aliphatic and cycloaliphatic hydrocarbon radicals; with the proviso that at least one occurrence of R contains 10 to 20 carbon atoms.

5. A process for preventing corrosion of ferrous metals, comprising the step of applying to such metals a substituted imidazoline of the following formula type:

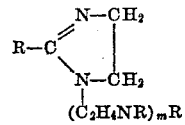

wherein $m$ is the numeral 1 to 6, and R is a member of the class consisting of hydrogen atoms, and aliphatic and cycloaliphatic hydrocarbon radicals; with the proviso that at least one occurrence of R is in aliphatic hydrocarbon radical containing from 10 to 20 carbon atoms.

6. A process for preventing corrosion of ferrous metals, comprising the step of applying to such metals 1-(N-dodecyl) aminoethylaminoethyl, 2-methylimidazoline.

7. A process for preventing corrosion of ferrous metals, comprising the step of applying to such metals 1-triethylenetriamino, 2-abietylimidazoline.

8. A process for preventing corrosion of oil and gas well equipment, comprising the step of injecting into such well a substituted imidazoline of the following formula type:

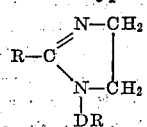

in which D represents a divalent organic radical containing less than 25 carbon atoms, composed of elements from the group consisting of C, H, O, and N, and containing at least one amino group, and R is a member of the class consisting of hydrogen atoms, and aliphatic and cycloaliphatic hydrocarbon radicals; with the proviso that at least one occurrence of R contains from 8 to 32 carbon atoms.

9. A process for preventing corrosion of oil and gas well equipment, comprising the step of injecting into such well a substituted imidazoline of the following formula type:

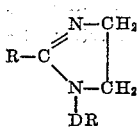

in which D represents a divalent organic radical containing less than 25 carbon atoms, composed of elements from the group consistings of C, H, O, and N, and containing at least one amino group, and R is a member of the class consisting of hydrogen atoms, an aliphatic and cycloaliphatic hydrocarbon radicals; with the proviso that at least one occurrence of R contains from 8 to 32 carbon atoms.

10. A process for preventing corrosion of oil and gas well equipment, comprising the step of injecting into such well a substituted imidazoline of the following formula type:

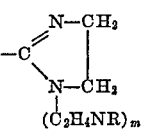

wherein $m$ is the numeral 1 to 6, and R is a member of the class consisting of hydrogen atoms, and aliphatic and cycloaliphatic hydrocarbon radicals; with the proviso that at least one occurrence of R contains 8 to 32 carbon atoms.

11. A process for preventing corrosion of oil and gas well equipment, comprising the step of injecting into such well a substituted imidazoline of the following formula type:

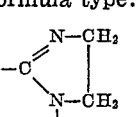

wherein $m$ is the numeral 1 to 6, and R is a member of the class consisting of hydrogen atoms, and aliphatic and cycloaliphatic hydrocarbon radicals; with the proviso that at least one occurrence of R contains 10 to 20 carbon atoms.

12. A process for preventing corrosion of oil and gas well equipment, comprising the step of injecting into such well a substituted imidazoline of the folloing formula type:

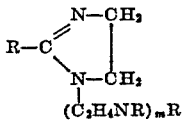

wherein $m$ is the numeral 1 to 6, and R is a member of the class consisting of hyrogen atoms, and aliphatic and cycloaliphatic hydrocarbon radicals; with the proviso that at least one occurrence of R is an aliphatic hydrocarbon radical containing from 10 to 20 carbon atoms.

13. A process for preventing corrosion of oil and gas well equipment, comprising the step of injecting into such well 1-aminoethyl, 2-heptadecylimidazoline.

14. A process for preventing corrosion of oil and gas well equipment, comprising the step of injecting into such well 1-(N-dodecyl)aminoethylaminoethyl,2-methylimidazoline.

15. A process for preventing corrosion of oil and gas well equipment, comprising the step of injecting into such well 1-triethylenetriamino,-2-abietylimidiazoline.

16. A process for preventing corrosion of equipment in oil and gas wells, comprising the step of injecting into such wells a carboxylic acid salt of a substituted imidazoline of the following formula type:

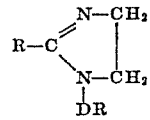

in which D represents a divalent organic radical containing less than 25 carbon atoms, composed of elements from the group consisting of C, H, O, and N, and containing at least one amino group, and R is a member of the class consisting of hydrogen atoms, and aliphatic and cycloaliphatic hydrocarbon radicals; with the proviso that at least one occurrence of R contains from 8 to 32 carbon atoms.

CHARLES M. BLAIR, JR.
WILLIAM F. GROSS.

REFERENCES CITED

The following references are of record in the file of this patent:

UNITED STATES PATENTS

| Number | Name | Date |
|---|---|---|
| 1,829,705 | Walker | Oct. 27, 1931 |
| 1,873,084 | Walker | Aug. 23, 1932 |
| 2,357,559 | Smith | Sept. 5, 1944 |

OTHER REFERENCES

Formaldehyde vs. Sulfide Corrosion—article in Industrial and Engineering Chemistry, Industrial Edition, Special Departments, vol. 38, pp. 10 and 14, January 16, 1946.

Condensate Field Corrosion—article in The Oil Weekly, May 6, 1946, page 32.